(12) United States Patent
Naito et al.

(10) Patent No.: US 8,822,010 B2
(45) Date of Patent: Sep. 2, 2014

(54) ELEMENT FOR ELECTRONIC COMPONENT

(75) Inventors: Kazumi Naito, Tokyo (JP); Yuji Osawa, Tokyo (JP); Toshio Nagashima, Tokyo (JP); Masakazu Kobayashi, Tokyo (JP)

(73) Assignee: Showa Denko K.K., Tokyo (JP)

( * ) Notice: Subject to any disclaimer, the term of this patent is extended or adjusted under 35 U.S.C. 154(b) by 923 days.

(21) Appl. No.: 12/866,191

(22) PCT Filed: Feb. 5, 2009

(86) PCT No.: PCT/JP2009/051937
§ 371 (c)(1),
(2), (4) Date: Sep. 20, 2010

(87) PCT Pub. No.: WO2009/099127
PCT Pub. Date: Aug. 13, 2009

(65) Prior Publication Data
US 2011/0017982 A1     Jan. 27, 2011

(30) Foreign Application Priority Data

Feb. 5, 2008   (JP) .................................. 2008-025770

(51) Int. Cl.
| | | |
|---|---|---|
| *H01L 51/30* | (2006.01) |
| *B05D 3/14* | (2006.01) |
| *H01G 9/04* | (2006.01) |
| *H01G 11/48* | (2013.01) |
| *H01G 9/028* | (2006.01) |
| *H01G 9/00* | (2006.01) |
| *H01G 11/56* | (2013.01) |

(52) U.S. Cl.
CPC ................. *H01G 9/028* (2013.01); *Y02E 60/13* (2013.01); *H01G 9/04* (2013.01); *H01G 11/48* (2013.01); *H01G 9/0029* (2013.01); *H01G 11/56* (2013.01)
USPC .......................................................... 428/137

(58) Field of Classification Search
USPC ........................................................... 428/137
See application file for complete search history.

(56) References Cited

U.S. PATENT DOCUMENTS

| | | | | |
|---|---|---|---|---|
| 5,473,503 A | * | 12/1995 | Sakata et al. .................. | 361/525 |
| 2007/0141745 A1 | | 6/2007 | Naito et al. | |
| 2007/0212844 A1 | * | 9/2007 | Lin ............................... | 438/381 |

FOREIGN PATENT DOCUMENTS

| | | | |
|---|---|---|---|
| JP | 07-094368 A | 4/1995 |
| JP | 2003-109850 A | 4/2003 |
| JP | 2004-349525 A | 12/2004 |
| JP | 2005-150705 A | 6/2005 |
| JP | 2007-059853 A | 3/2007 |

* cited by examiner

*Primary Examiner* — William P Watkins, III
(74) *Attorney, Agent, or Firm* — Sughrue Mion, PLLC (57) ABSTRACT

A surface of an anode body made of a metal material having a valve action is oxidized so as to form a dielectric layer, a conductive polymer precursor solution is stuck to the surface of the dielectric layer, the solvent is evaporated in an atmosphere of a relative humidity of 30 to 45% to be removed, electropolymerization is carried out so as to obtain a semiconductor layer having projections being 2 to 70 μm high on the outer surface thereof, a conductive carbon layer is laminated using a conductive carbon paste, and a conductive metal layer containing a metal conductive powder and a binder is laminated so as to obtain an element for an electronic component, and the element for an electronic component is encapsulated by a resin so as to obtain an electronic component.

32 Claims, 1 Drawing Sheet

ELEMENT FOR ELECTRONIC COMPONENT

TECHNICAL FIELD

The present invention relates to an element for an electronic component. More particularly, the present invention relates to an element for an electronic component in which if another layer is laminated on a semiconductor layer, the another layer is hardly separated even after being left for a long time under high temperature and high humidity.

BACKGROUND ART

A solid electrolytic capacitor has a solid electrolytic capacitor element encapsulated by a resin or the like. The solid electrolytic capacitor element in general has an anode body, a dielectric layer, a semiconductor layer, a conductive carbon layer and a conductive metal layer which are laminated in this order. The anode body is composed of a porous body obtained by compacting and sintering a powder of valve metal, for example. The dielectric layer is composed of a dielectric coat obtained by anodizing the surface layer of the porous body, for example. An anode lead is connected to the anode body in an electric conductible state, and the anode lead is exposed to the outside of a package of the solid electrolytic capacitor so as to become an anode terminal. On the other hand, a cathode layer is composed of the conductive carbon layer and the conductive metal layer laminated on the semiconductor layer, and a cathode lead is connected to the cathode layer in an electric conductible state so that the cathode lead is exposed to the outside of the package of the solid electrolytic capacitor so as to become a cathode terminal.

The conductive carbon layer is usually made by applying a conductive carbon paste on the surface of the semiconductor layer. A boundary between the conductive carbon layer and the semiconductor layer can be easily separated due to a mechanical stress or a thermal stress, and a gap might be generated. The generation of the gap might result in increasing of equivalent series resistance (ESR) or increasing of a leakage current. Particularly, if the capacitor is left for a long time under high temperature and high humidity, separation at the boundary between the conductive carbon layer and the semiconductor layer can easily progress.

As mentioned above, if another layer such as the conductive carbon layer is laminated on the semiconductor layer, the laminated another layer might be often separated after being left for a long time under high temperature and high humidity in a element for an electronic component comprising a traditional semiconductor layer.

As a method of forming a conductive polymer layer as a semiconductor layer of an element for an electronic component, a chemical oxidative polymerization method and an electropolymerization method are known. Patent Document 1 describes that in the chemical oxidative polymerization method, the conductive polymer layer might be composed of an agmina of fine particles obtained by abnormally growing in one direction around the fine particles as a core. As an improved method of the chemical oxidative polymerization, Patent Document 1 describes a method in which the element surface is impregnated with a conductive monomer and an oxidizing agent and then, ultrasonic vibration is applied so as to make a conductive polymer layer having a thickness evenly adjusted. Also, Patent Document 2 discloses a method of forming a conductive polymer layer in which a solution containing an oxidizing agent and a solution containing a conductive polymer precursor are stuck to a substrate; and temperature, humidity, wind speed and pressure are adjusted so that a specific relationship is implemented in the amount of a solvent in the stuck solution at start of the chemical oxidative polymerization and the amount of a solvent in the stuck solution upon termination of the polymerization to be subjected to the chemical oxidative polymerization.

On the other hand, as the electropolymerization method, Patent Document 3 discloses a method in which a solution of the conductive polymer precursor is stuck to the substrate and the substrate is dried, and then the substrate soaked in an electrolytic solution is electrified. The Document describes that an ESR value is lowered by this method.

PRIOR ART DOCUMENTS

Patent Document 1: JP 2003-109850 A
Patent Document 2: JP 2007-059853 A
Patent Document 3: JP 2005-150705 A

DISCLOSURE OF INVENTION

Problems to be Resolved by the Invention

However, it was found out that, if a laminate of a conductive carbon layer obtained by applying a conductive carbon paste and the conductive polymer layer obtained by the methods described in these Patent Documents is left for a long time under high temperature and high humidity, the conductive carbon layer is separated from the conductive polymer layer.

An object of the present invention is to provide an element for an electronic component in which, if another layer is laminated on a semiconductor layer, the another layer is hardly separated even after being left for a long time under high temperature and high humidity.

Means of Solving the Problems

The inventors had earnestly proceeded with investigation for the boundary between an organic semiconductor layer composed of a conductive polymer and a conductor layer made of a conductive carbon paste. As a result, they found out that, if there are projections having a height in a specific range on an outer surface of the semiconductor layer with which another layer is brought into contact, adhesiveness with the another layer such as the conductor layer is increased and separation in the boundary between the semiconductor layer and the another layer hardly occurs even after being left for a long time under high temperature and high humidity. The present invention has been completed by further research based on the findings.

That is, the present invention includes:
[1] An element for an electronic component comprising a semiconductor layer which has projections being 2 to 70 µm high on an outer surface of the semiconductor layer.
[2] An element for an electronic component comprising a semiconductor layer and one or more conductor layers which are laminated, in which there are projections on an outer surface of the semiconductor layer, the conductor layer in contact with the outer surface of the semiconductor layer is a conductive carbon layer, the projections on the outer surface of the semiconductor layer are embedded into the conductive carbon layer to not less than 25% deep of a thickness of the conductive carbon layer, and the tip of the projections does not protrude from the outer surface of the conductor layer.
[3] An element for an electronic component comprising an anode body, a dielectric layer, a semiconductor layer and one or more conductor layers which are laminated in this order, in which there are projections on an outer surface of the semiconductor layer, the conductor layer in contact with the outer surface of the semiconductor layer is a conductive carbon layer, the projections on the outer surface of the semiconductor layer are embedded into the conductive carbon layer to not less than 25% deep of a thickness of the conductive carbon layer, and the tip of the projections does not protrude from the outer surface of the conductor layer.

[4] The element for an electronic component according to any one of the [1] to [3], in which the size of the projections by observation from the normal direction of the semiconductor layer is not more than three times the height of the projections.

[5] The element for an electronic component according to any one of the [1] to [4], in which the number of the projections per unit area on the outer surface of the semiconductor layer is $10^1$ to $10^4/mm^2$.

[6] The element for an electronic component according to any one of the [1] to [5], in which the semiconductor layer comprises an organic semiconductor.

[7] The element for an electronic component according to the [6], in which the organic semiconductor is a conductive polymer having a repeating unit derived from at least one compound selected from pyrroles, thiophenes, alkylthiophenes, alkylenedioxythiophenes, anilines, phenylenes, acetylenes, furanes, phenylenevinylenes, acenes, and azulenes.

[8] The element for an electronic component according to the [6], in which the organic semiconductor contains a conductive polymer having a repeating unit derived from 3,4-ethylenedioxythiophene.

[9] The element for an electronic component according to the [6], in which the semiconductor layer further comprises arylsulfonic acid or its salt.

[10] The element for an electronic component according to the [2] or [3], in which the conductor layer comprises the conductive carbon layer and a conductive metal layer.

[11] The element for an electronic component according to the [10], in which the conductive metal layer comprises a conductive metal powder and a binder.

[12] The element for an electronic component according to the [11], in which the conductive metal powder is at least one powder selected from the group consisting of silver powder, copper powder, aluminum powder, nickel powder, copper-nickel alloy powder, silver alloy powder, silver mixed powder, and silver coated powder.

[13] The element for an electronic component according to the [11], in which the binder is a resin.

[14] The element for an electronic component according to the [10], in which the conductive metal layer comprises 3 to 10% by mass of resin and 90 to 97% by mass of conductive metal powder.

[15] An electronic component comprising an element for an electronic component according to any one of the above [1] to [14] in which the element is encapsulated.

[16] An electronic component according to the [15], in which the electronic component is a solid electrolytic capacitor.

[17] A manufacturing method of an element for an electronic component, comprising the step of sticking a solution of a conductive polymer precursor to the surface of an element substrate, evaporating a solvent under an atmosphere of 30% to 45% relative humidity to remove the solvent from the solution, and then electropolymerizing the conductive polymer precursor.

[18] The manufacturing method of an element for an electronic component according to the [17], in which the element substrate comprises an anode body and a dielectric layer obtained by denaturing a surface layer of the anode body.

[19] The manufacturing method of an element for an electronic component according to the [17] or [18], in which the electropolymerization is started within 12 minutes after the sticking of the conductive polymer precursor solution to the surface of the element substrate.

[20] The manufacturing method of an element for an electronic component according to any one of the [17] to [19], in which the conductive polymer precursor is at least one compound selected from pyrroles, thiophenes, alkylthiophenes, alkylenedioxythiophenes, anilines, phenylenes, acetylenes, furanes, phenylenevinylenes, acenes, and azulenes.

Advantageous Effects of Invention

With regard to the element for the electronic component of the present invention, if another layer is laminated on a semiconductor layer, the another layer is hardly separated even after being left for a long time under high temperature and high humidity. As a result, for example, when the element for the electronic component of the present invention is employed as a solid electrolytic capacitor element, a solid electrolytic capacitor can be obtained in which, even if it is left for a long time under high temperature and high humidity, equivalent series resistance (ESR) is hardly raised and leakage current is low. Using the element for the electronic component of the present invention can give an electronic component with high reliability. The element for the electronic component of the present invention is suitable for a solid electrolytic capacitor.

EMBODIMENT OF THE INVENTION

The present invention will be described below in detail.

An element for an electronic component of the present invention comprises a semiconductor layer.

(Semiconductor Layer)

The semiconductor layer used in the present invention has an electric conductivity preferably of 0.1 to 200 S/cm, more preferably of 1 to 150 S/cm, or further preferably of 10 to 100 S/cm. The semiconductor layer is a layer that functions as a solid electrolyte.

A material used for the semiconductor layer includes an organic semiconductor and an inorganic semiconductor. In the present invention, the organic semiconductor is preferable in view of easiness of manufacture.

The organic semiconductor includes a conductive polymer. The conductive polymer includes a conductive polymer having a repeating unit derived from at least one compound selected from pyrroles, thiophenes, alkylthiophenes, alkylenedioxythiophenes, anilines, phenylenes, acetylenes, furanes, phenylenevinylenes, acenes, and azulenes. Among them, a conductor polymer having a repeating unit derived from 3,4-ethylenedioxythiophene is preferable.

The element for the electronic component of the present invention has projections on an outer surface of the semiconductor layer. The height of the projections is preferably 2 to 70 μm, and more preferably 10 to 20 μm. With any projections having the height in this range, another layer (a conductor layer, for example) generally used for the element for an electronic component can be widely applied, and separation from the another layer hardly occurs in the boundary. The shape of the projections is indefinite. Cylinder or spherical projections, for example, are included.

The size of the projections is preferably not more than three times, more preferably not more than tow times, or particularly preferably not more than one time the height of the projections. The size of the projections is an average value of longitudinal length and lateral length in the projections by observation from the normal direction of the semiconductor layer.

The number of projections per unit area on the outer surface of the semiconductor layer is preferably $10^1$ to $10^4/mm^2$, or more preferably $10^2$ to $10/mm^2$. The semiconductor layer being within this range in the number of projections per unit area on the outer surface thereof has high adhesiveness with the conductor layer or the like laminated on the outer surface thereof.

A preferable method of obtaining the semiconductor layer having projections on the outer surface is a method comprising the steps of sticking a solution of a conductive polymer precursor to the surface of an element substrate, evaporating the solvent in an atmosphere of 30 to 45% relative humidity to remove the solvent from the solution, and then electropolymerizing the conductive polymer precursor.

(Element Substrate)

An element substrate used to obtain the semiconductor layer can be selected as appropriate in accordance with the purpose of the element for an electronic component, but the element substrate for easy electropolymerization preferably contains a conductive material. In order to have a solid electrolytic capacitor element, for example, an element substrate composed of a laminate comprising an anode body and a dielectric layer obtained by denaturing a surface layer of the anode body is preferably used. Then, the element substrate will be explained using the substrate for the solid electrolytic capacitor element as an example.

(Anode Body)

The anode body of the solid electrolytic capacitor element is usually made of a metallic material having a valve action. The metallic material having a valve action includes aluminum, tantalum, niobium, titanium, zirconium, an alloy containing any of them and the like. The anode body is selected from forms of a foil, a rod, a porous body and the like. The anode body may have a lead wire extracted from the anode body in order to ease connection with an anode lead, which will be described later.

(Dielectric Layer)

In the solid electrolytic capacitor element, the dielectric layer is formed in the surface of the anode body. The dielectric layer can be also formed by oxidizing the surface layer of the anode body by oxygen in the air. Also the surface oxidation is particularly preferably carried out by known chemical conversion treatment.

(Conductive Polymer Precursor)

The conductive polymer precursor used to obtain the semiconductor layer includes a monomer or oligomer with which a conductive polymer can be obtained. Specifically, the conductive polymer precursor includes at least one compound selected from pyrroles, thiophenes, alkylthiophenes, alkylenedioxythiophenes, anilines, phenylenes, acetylenes, furanes, phenylenevinylenes, acenes, and azulenes. They can be used singly or in combination of two or more. Among them, pyrroles, alkylthiophenes, alkylenedioxythiophenes, and anilines, which are excellent in anti-corrosion and electric conductivity, are preferable and 3,4-ethylenedioxythiophene is particularly preferable among them.

Thiophenes include 3-methylthiophene, 3-ethylthiophene, 3-n-propylthiophene, 3-n-butylthiophene, 3-n-pentylthiophene, 3-n-hexylthiophene, 3-n-heptylthiophene, 3-n-octylthiophene, 3-n-nonylthiophene, 3-n-decylthiophene, 3-n-undecylthiophene, 3-n-dodecylthiophene, 3-n-octadodecylthiophene, 3-methoxythiophene, 3-phenylthiophene, 3-thiophenecarboxylic acid, 3-thiophenealdehyde, thiophene-3-acetic acid, 3-thiopheneethanol, 3-thiophenemalonic acid, 3-thiophenemethanol, 3-fluorothiophene, 3-bromothiophene, 3-iodothiophene, 3-cyanothiophene, 3-bromo-4-methylthiophene, 3,4-dimethylthiophene, 3,4-diethylthiophene, 3,4-butylenethiophene, 3,4-methylenedioxythiophene, 3,4-ethylenedioxythiophene and the like. These compounds are commercially available. Also, they can be prepared by a known method as described in Synthetic Material (1986), vol. 15, page 169 and the like.

Moreover, thiophenes include compounds having a 1,3-dihydrobenzo[c]thiophene skeleton, compounds having 1,3-dihydronapht[2,3-c]thiophene skeleton, compounds having 1,3-dihydroantra[2,3-c]thiophene skeleton, compounds having 1,3-dihydronaphtaceno[2,3-c]thiophene skeleton. They can be prepared by a known method as described in JP H08-3156 A, for example.

Also, mentioned are compounds having 1,3-dihydronapht[1,2-c]thiophene skeleton, 1,3-dihydrophenanthra[2,3-c]thiophene derivatives, compounds having 1,3-dihydrotriphenylo[2,3-c]thiophene skeleton, 1,3-dihydrobenzo[a]anthraceno[7,8-c]thiophene derivatives; 1,3-dihydrothieno[3,4-b]quinoxaline, 1,3-dihydrothieno[3,4-b]quinoxaline-4-oxide, 1,3-dihydrothieno[3,4-b]quinoxaline-4,9-dioxide and the like.

Pyrroles include compounds such as 3-methylpyrrole, 3-ethylpyrrole, 3-propylpyrrole, 3-butylpyrrole, 3-pentylpyrrole, 3-hexylpyrrole, 3-heptylpyrrole, 3-octylpyrrole, 3-nonylpyrrole, 3-decylpyrrole, 3-fluoropyrrole, 3-chloropyrrole, 3-bromopyrrole, 3-cyanopyrrole, 3,4-dimethylpyrrole, 3,4-diethylpyrrole, 3,4-butylenepyrrole, 3,4-methylenedioxypyrrole, 3,4-ethylenedioxypyrrole, and the like. These compounds are commercially available or may be prepared by a known method.

Furans include compounds such as 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-dibutylfuran, 3,4-butylenefuran, 3,4-methylenedioxyfuran, 3,4-ethylenedioxyfuran, and the like. These compounds are commercially available or may be prepared by a known method.

Anilines include compounds such as 2-methylaniline, 2-ethylaniline, 2-propylaniline, 2-butylaniline, 2-pentylaniline, 2-hexylaniline, 2-heptylaniline, 2-octylaniline, 2-nonylaniline, 2-decylaniline, 2-fluoroaniline, 2-chloroaniline, 2-bromoaniline, 2-cyanoaniline, 2,5-dimethylaniline, 2,5-diethylaniline, 2,3-butyleneaniline, 2,3-methylenedioxyaniline, 2,3-ethylenedioxyaniline, and the like. These compounds are commercially available or may be prepared by a known method.

The solvent used in the precursor solution is not particularly limited as long as the solvent can dissolve the precursor. For example, nitromethane, acetonitrile, propylenecarbonate, nitrobenzene, cyanobenzen, ion-exchanged water, o-dichlorobenzene, dimethylsulfoxido, γ-butyrolactone, N,N-dimethylformamide, glycerin, water, ethylalcohol, propylalcohol, dimethylcarbonate, ethylenecarbonate, N-methylpyrolidone, 2-methyltetrahydrofuran, 1,2-dimethoxyethane, toluene, tetrahydrofuran, benzonitrile, cyclohexane, n-hexane, acetone, 1,3-dioxolan, furan, benzotrifluoride and the like are mentioned.

A solution of the precursor is stuck to the surface of the element substrate. The methods of sticking include an immersion method, an atomization method and the like. If an element substrate made of a porous body is used, the immersion method is preferable from the viewpoint that the precursor solution can easily penetrate into pores of the porous body and the precursor solution does not stick to unnecessary portions.

After the precursor solution has stuck to the surface of the element substrate, the solvent is evaporated and removed. In the evaporation and removal of the solvent, it is necessary that an atmosphere is 30 to 45% relative humidity, or preferably 33 to 42% relative humidity. If the relative humidity goes out of this range, projections are not formed on the outer surface of the semiconductor layer. Temperature, pressure and wind speed in evaporation and removal of the solvent are not particularly limited, but the temperature is preferably 5 to 35° C., and the wind speed is preferably 0.01 to 0.5 m/s.

Subsequently, electropolymerization is carried out. The electropolymerization can be carried out by a common procedure. For example, the electropolymerization can be carried out by applying a voltage between a working electrode and a counter electrode in an electropolymerization solution in which the working electrode is the element substrate to which the precursor solution is stuck. In this case, platinum, tantalum, carbon, iron alloy and the like can be used as the counter electrode. As a reference electrode, a hydrogen electrode, a calomel electrode, an $Ag/Ag^+$ electrode and the like can be used.

The electropolymerization solution is a liquid containing the conductive polymer precursor and an electrolyte to give sufficient conductivity to the solution. Moreover, in the electropolymerization solution, a pH buffer solution may be contained as necessary. The solvent used for the electropolymerization solution can be selected from those cited as the solvent that can be used in the conductive polymer precursor solution accordingly.

The electrolytes include tetraethylammonium perchlorate, tetra(n-butyl)ammonium perchlorate, lithium perchlorate, sodium perchlorate, potassium perchlorate, tetraethylammonium tetrafluoroborate, tetra(n-butyl)ammonium tetrafluoroborate, sodium tetrafluoroborate, tetraethylammonium hexafluorophosphate, p-toluenesulfonic acid salt, tetra(n-butyl)ammonium hexafluorophosphate, lithium chloride, phthalocyanine derivative, dialkylammonium salt, dopant and the like. The concentration of the precursor in the electropolymerization solution is selected accordingly but it is preferably 0.1 to 1 mol/l, or particularly preferably 0.25 to 0.6 mol/l. The concentration of the electrolyte is not particularly limited, either, but it is preferably 0.05 to 2 mol/l, or particularly preferably 0.1 to 1.5 mol/l.

The electropolymerization solution is filled in a polymerization tank and the counter electrode and the working electrode are attached. Applying a predetermined current or voltage between the counter electrode and the working electrode generates a conductive polymer on the working electrode. The electropolymerization is usually performed in the air but may be performed in an inert gas atmosphere such as a nitrogen gas or an argon gas, for example. The electropolymerization is performed while the electropolymerization solution is agitated as necessary. An appropriate range is set for the voltage by an oxidation potential of the precursor. In the electropolymerization, any of controlled potential electrolysis, galvanostatic electrolysis, potential scan electrolysis, alternating current electrolysis and the like can be used. In the present invention, galvanostatic electrolysis is preferable. The current density is 0.2 to 2 $mA/cm^2$. The temperature during the electropolymerization is not particularly limited and it is usually near room temperature.

The electropolymerization is started preferably within 12 minutes, or more preferably within 10 minutes, after the sticking of the conductive polymer precursor solution to the surface of the element substrate. If being left for a long time after the sticking of the precursor solution till start of the polymerization, projections can be hardly generated on the outer surface of the semiconductor layer.

After the electropolymerization is completed, the working electrode may be taken out, washed and dried as necessary. Also, the sticking of the conductive polymer precursor solution, the evaporation and removal of the solvent, and the electropolymerization can be repeated till a predetermined semiconductor layer is obtained. After the semiconductor layer is formed or at an arbitrary time during the repeated performance of the electropolymerization, chemical conversion treatment may be performed so as to fix the dielectric layer which was damaged during the formation of the semiconductor layer.

As mentioned above, the semiconductor layer having the projections on the outer surface can be laminated on the element substrate. Also, it may be so configured that a flat semiconductor layer being less than 5 μm thick is formed on the outer surface of the element substrate and then, a semiconductor layer having projections on the flat semiconductor layer is formed.

The semiconductor layer preferably contains arylsulfonic acid or its salt as a dopant. The arylsulfonic acid or its salt includes benzenesulfonic acid, toluenesulfonic acid, naphthalenesulfonic acid, anthracenesulfonic acid, benzquinonesulfonic acid, anthraquinonesulfonic acid and their salts. A method of making the arylsulfonic acid or its salt contained in the semiconductor layer includes a method of impregnating the element substrate with the solution of the arylsulfonic acid or its salt that is a dopant solution. The impregnation of the dopant solution may be carried out before the conductive polymer precursor solution is stuck to the element substrate, may be carried out at the same time as the impregnation of the conductive polymer precursor solution by making the dopant contained in the conductive polymer precursor solution, or may be carried out at the same time as the electropolymerization by making the dopant contained in the electropolymerization solution.

(Conductor Layer)

The element for the electronic component in the present invention preferably has one or more conductor layers laminated on the semiconductor layer.

The conductor layer includes a conductive carbon layer, a conductive metal layer and the like. The conductor layer has one or more layers laminated. The conductor layer preferably has the conductive carbon layer and the conductive metal layer laminated. Also, the conductor layer in contact with the outer surface of the semiconductor layer is preferably a conductive carbon layer.

(Conductive Carbon Layer)

The conductive carbon layer can be formed by applying a paste containing a conductive carbon and a binder to a target so as to make it impregnated, drying the applied paste and carrying out thermal treatment. The conductive carbon is preferably a material containing usually not less than 60% by mass, or preferably not less than 80% by mass of graphite powder. The graphite powder includes scale-shaped or leaf-shaped natural graphite, carbon black such as acetylene black or Ketjen black and the like. The preferable conductive carbon is 97% by mass or more in a solid carbon component, 1 to 13 μm in an average grain size, 10 or less in an aspect ratio, and 12% by mass or less in a content of particles having the grain size of 32 μm or more.

The binder is a component to firmly bond or fix a large amount of solid particles and the like for reinforcement of molding. A resin component is mainly used as the binder.

Specific examples of the binder include phenol resins, epoxy resins, unsaturated alkyd resins, polystyrene, acrylic resins, cellulose resins, rubbers and the like. The rubbers include isoprene rubbers, butadiene rubbers, styrene/butadiene rubbers, nitrile rubbers, butyl rubbers, ethylene/propylene copolymers (e.g. EPM, or EPDM), acrylic rubbers, polysulfide rubbers, fluorine polymers, silicone rubbers, other thermoplastic elastomers and the like. Among them, EPM, EPDM, or fluorine polymers are preferable.

The solvent used for the paste containing the conductive carbon and the binder is not particularly limited and includes N-methylpyrolidone, N,N-dimethylacetoamide, dimethylformamide, butyl acetate, water and the like. A mixing ratio of the conductive carbon and the binder in the conductive carbon paste is such that the conductive carbon is usually 30 to 99% by mass, or preferably 50 to 97% by mass in the total solid mass, and the binder resin is usually 1 to 70% by mass, or preferably 3 to 50% by mass in the total solid mass. The conductive carbon layer has a thickness of usually 10 to 40 µm.

(Conductive Metal Layer)

The conductive metal layer is a layer containing a conductive metal powder. It is usually formed by applying a paste containing the conductive metal powder and a binder to a target. The conductive metal layer is preferably formed on the above-mentioned conductive carbon layer.

The conductive metal powder includes silver powder, copper powder, aluminum powder, nickel powder, copper-nickel alloy powder, silver alloy powder, silver mixed powder, silver coated powder, and the like. Among them, silver powder, alloy having silver as a main component such as silver-copper alloy, silver-nickel alloy, silver-palladium alloy and the like, mixed powders having silver as a main component such as mixed powder of silver and copper, mixed powder of silver and nickel and/or palladium and the like, and silver coated powder such as those obtained by coating the surface of a powder such as copper powder or nickel powder with silver, are preferable. Particularly, the silver powder is preferable.

The binder is not particularly limited as long as it can bind the conductive metal powder. As the binder, a resin or rubber is mentioned for example, and a resin is preferably mentioned.

The resin includes acrylic resin, alkyd resin, epoxy resin, phenol resin, imide resin, fluorine resin, ester resin, imideamide resin, amide resin, styrene resin, urethane resin and the like. The rubber includes SBR, NBR, IR and the like.

The conductive metal layer preferably has usually 3 to 10% by mass, or preferably 5 to 10% by mass of the resin, and usually 90 to 97% by mass, or preferably 90 to 95% by mass of the conductive metal powder, in which the total of the acrylic resin and the conductive metal powder is 100% by mass. If the amount of the resin is too small, adhesiveness between the conductive metal layer and the conductive carbon layer tends to be lowered. On the contrary, if the amount of the resin is too large, it tends to be easily subjected to thermal stress in a reflow furnace or the like.

The conductive metal layer can be formed by applying the conductive metal paste containing the conductive metal powder and the binder on the conductive carbon layer so as to make it impregnated, drying the applied paste and carrying out thermal treatment.

The conductive metal paste may contain a curing agent for resin, a dispersing agent, a coupling agent such as titanium coupling agent or silane coupling agent, a conductive polymer, a powder of metal oxides and the like. The curing agent or the coupling agent can harden the conductive metal paste by heating to give a firm conductive metal layer.

The conductive metal layer usually has a thickness of 1 to 100 µm, or preferably 10 to 35 µm. In the conductive metal layer used in the present invention, since the conductive metal powder is accumulated evenly and favorably even in such a thin layer, favorable conductivity can be maintained and the ESR value is kept low. The whole lamination of the conductive carbon layer and the conductive metal layer could be called the conductor layer.

In the element for an electronic component of the present invention, the projections on the outer surface of the semiconductor layer are embedded in the conductive carbon layer to the depth of preferably not less than 25%, or more preferably not less than 50% of the thickness of the conductive carbon layer. If the embedded depth of the projections into the conductive carbon layer is small, adhesiveness between the semiconductor layer and the conductor layer does not become sufficiently high, and they tend to be separated under high temperature and high humidity.

Additionally, the tip of the projections is preferably not protruded from the outer surface of the conductor layer. If the projections go through the conductor layer, the external dimension becomes large.

The electronic component of the present invention is formed by encapsulating the above-mentioned element for an electronic component. The encapsulated element for the electronic component may be one or plural. The encapsulating method is not particularly limited. The methods include resin mold package, resin case package, metal case package, package by resin dipping, package by laminate film and the like. Among them, the resin mold package is preferable since downsizing and cost reduction can be made easily.

As the resin used for the resin mold package, known resins used in encapsulating of an element for an electronic component such as epoxy resin, phenol resin, alkyd resin and the like can be employed. As the encapsulation resin, low-stress resin is preferably used since it can alleviate generation of a stress to the element for an electronic component in encapsulating. Also, a transfer machine is suitably used as a manufacturing machine for encapsulating of resin. In the resin used for the package, silica particles and the like may be compounded.

The electronic component of the present invention is useful as a solid electrolytic capacitor. The electronic component of the present invention as the solid electrolytic capacitor can be suitably used in a circuit requiring a high-capacity capacitor such as a CPU, a power circuit and the like. These circuits can be used in various digital devices such as a personal computer, a server, a camera, a game machine, a DVD device, an AV device, a mobile phone and the like and electronic devices such as various power sources.

Since the electronic component of the present invention has an excellent ESR value, an electronic circuit and an electronic device with high-speed response can be obtained by using the electronic components.

EXAMPLES

Examples of the present invention will be shown to explain the present invention more specifically. They are only exemplification to explain the present invention, and the present invention is not limited by them. The unit "%" is a mass standard unless otherwise noted.

Examples 1 to 7 and Comparative Examples 1 to 4

A tantalum powder having CV that was product of capacity and formation voltage of 150,000 µF·V/g was compacted with a tantalum lead wire being 0.40 mmϕ, and the compact was calcined for 20 minutes at 1300° C. under a vacuum atmosphere so as to obtain a tantalum powder sintered compact having a density of 6.2 g/cm$^3$ and a size of 4.5 mm×1.0 mm×1.5 mm. The tantalum lead wire was embedded in the center of the 1.0 mm×1.5 mm face of the sintered compact by the depth of 4.0 mm and protrudes from the sintered compact by the length of 10 mm, which was an anode.

An aqueous solution of 1%-phosphoric acid was put in a chemical conversion tank having a negative plate made of tantalum, and the sintered compact was immersed in the phosphoric acid aqueous solution excluding a part of the lead wire. A voltage was applied to the lead wire of the sintered compact so as to generate a potential difference of 9 V between the lead wire and the negative plate for 8 hours at 65° C. in a chemical conversion treatment. By means of the chemical conversion treatment, the surface layer of the sintered compact was converted into a dielectric layer containing tantalum pentoxide. Subsequently, the sintered compact was immersed in an aqueous solution of 20% iron ethylbenzensulfonate excluding a part of the lead wire. Then, the sintered compact was taken out of the solution and dried at 105° C. The operation consisting of the immersion into the iron ethylbenzensulfonate aqueous solution and the drying was repeated three times.

The sintered compact in which the dielectric layer was formed was immersed in an alcohol solution of 15% 3,4-ethylenedioxythiophene excluding a part of the lead wire. As a result, 3,4-ethylenedioxythiophene that is conductive polymer precursor stuck on the fine pores surface and outer surface of the sintered compact. The sintered compact was taken out of the alcohol solution and left for 5 minutes under the humidity condition shown in Table 1. The wind speed when it was left was in a range of 0.05 to 0.3 m/s.

In the electropolymerization tank having a negative plate made of tantalum, an electropolymerization solution comprising 1% by mass of 3,4-ethylenedioxythiophene, 2% by mass of anthraquinonesulfonic acid, 20% by mass of ethylene glycol and remaining part of water were put, and the sintered compact on which the conductive polymer precursor stuck was immersed in the electropolymerization solution excluding a part of the lead wire. A direct current of 125 μA was made to flow between the lead wire and the negative plate for 50 minutes at a room temperature so as to perform the constant current electropolymerization. It took 5.5 minutes from the sticking of the precursor to the starting of the electropolymerization. The sintered compact after the electropolymerization was taken out, washed with alcohol and then dried.

An aqueous solution of 1% phosphoric acid was put into the chemical conversion tank having a negative plate made of tantalum, and the sintered compact was immersed in the 1% phosphoric acid aqueous solution excluding a part of the lead wire. A chemical conversion retreatment was applied at a potential difference of 8 V between the lead wire and the negative plate for 15 minutes at 60° C. By means of the chemical conversion retreatment, a micro LC (leakage current) defect in the dielectric layer was recovered. The operation consisting of the sticking of the conductive polymer precursor, the electropolymerization and the chemical conversion retreatment was repeated 6 times.

The sintered compact after the above repeated operation was washed with water and further washed with alcohol and dried so as to obtain an element for an electronic component in which the semiconductor layer was formed.

Figure 1:
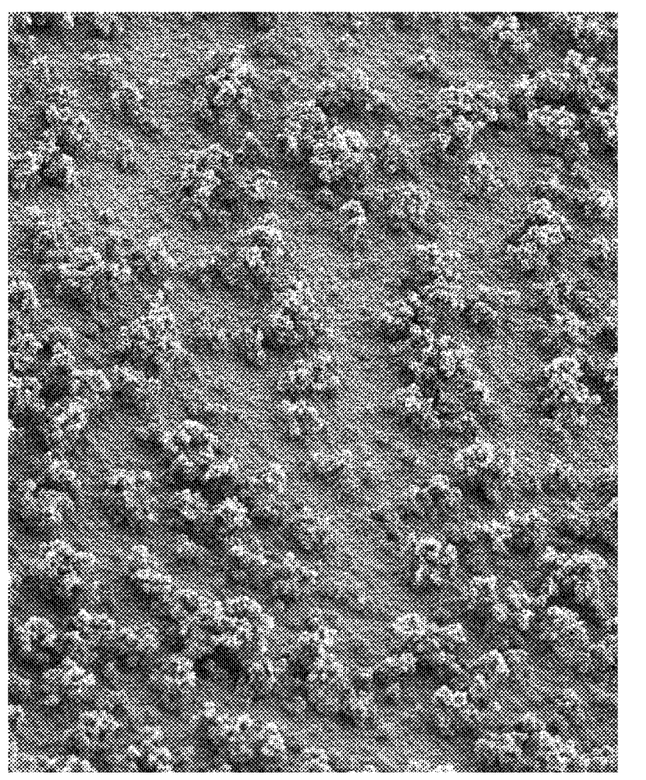
FIG. 1 is a view illustrating an example of electronic microscope image of an outer surface of a semiconductor layer.

The element for the electronic component in Examples 1 to 7 had projections having the size shown in Table 1 on the outer surface of the semiconductor layer. FIG. 1 is a view showing an image of the outer surface of the semiconductor layer observed by an electronic microscope photograph in Example 1. A plurality of the projections with the shape as shown in FIG. 1 were observed on the outer surface. The elements for the electronic component in Comparative Examples 1 to 4 did not have any projections on the outer surface of the semiconductor layer.

On the outer surface of the semiconductor layer excluding the surface in which the lead wire was embedded, the conductive carbon paste was applied and dried so as to form the conductive carbon layer having the thickness shown in Table 1. Moreover, the silver paste was applied on the outer surface of the conductive carbon layer and dried so as to form the conductive metal layer. The thickness of the conductive metal layer was 30 to 70 μm. As a result, a solid electrolytic capacitor element having the conductive metal layer as the cathode and the lead wire made of tantalum as the anode was obtained. No projection was observed on the outer surface of the conductive metal layer.

On a pocket in a lead frame made of copper alloy having a thickness of 100 μm in which copper plating having an average thickness of 1 μm was deposited on the copper alloy and tin plating having an average thickness of 7 μm was deposited on the copper plating, a pair of terminals having a width of 3.4 mm was disposed opposing each other inward of the lead frame, the one terminal distal end having a step of 0.5 mm high made into the pocket, and there was a gap of 1.0 mm between the opposing pair of terminals, two of the above-mentioned solid electrolytic capacitor elements were placed so that the lead wires were oriented to the same direction and the 4.5 mm×1.0 mm faces were opposed to each other. The 4.5 mm×1.5 mm face and the one terminal distal end were connected to each other by a silver paste. The lead wire was cut off to a required length and the lead wire was connected to the another terminal distal end by spot welding.

With the exception of a part of the terminal of the lead frame, the solid electrolytic capacitor element was encapsulated by transfer molding using an epoxy resin. The terminal of the lead frame extending out of the encapsulation resin package was cut to a predetermined length and the terminal was bent along the resin package so as to have an external terminal. The epoxy resin was heated and hardened at 165° C., and 320 solid electrolytic capacitors having a size of 7.3 mm×4.3 mm×1.8 mm were obtained. After the hardening, they were left in a constant-humidity bath of 85° C. and 80% RH for 24 hours. The capacitors were taken out of the constant-humidity bath and subjected to aging treatment for 6 hours at 140° C. and 3.0V.

(Measurement of Capacity and ESR)

The capacity and the ESR (100 kHz) of the solid electrolytic capacitor obtained as above were measured by an LCR meter provided by Agilent Technologies. Then, the capacitor was left for 1000 hours in the constant-humidity bath of 85° C. and 80% RH. The ESR (100 kHz) of the solid electrolytic capacitor after being left was measured by an LCR meter provided by Agilent Technologies. An average value was obtained from the measured values of 300 solid electrolytic capacitors. It shows that the larger the ESR rises, the greater the separation between the semiconductor layer and the conductive carbon layer progresses.

The result is shown in Table 1. In Examples 1 to 7 and Comparative Examples 1 to 4, the operations other than the one for which the temperature and the humidity were particularly indicated were performed in a constant-humidity booth at the temperature of 21° C.

TABLE 1

|  | Example | | | | | | | Comp. Example | | | |
| --- | --- | --- | --- | --- | --- | --- | --- | --- | --- | --- | --- |
|  | 1 | 2 | 3 | 4 | 5 | 6 | 7 | 1 | 2 | 3 | 4 |
| Projection height [μm] | 11 | 26 | 31 | 47 | 20 | 12 | 8 | — | — | — | — |
| Projection size [μm] | 18 | 36 | 58 | 90 | 55 | 35 | 15 | — | — | — | — |
| Projection density [pieces/mm$^2$] | 2000 | 400 | 200 | 100 | 250 | 600 | 2400 | — | — | — | — |
| Carbon layer thickness [μm] | 30 | 25 | 22 | 22 | 23 | 20 | 25 | 35 | 28 | 38 | 24 |
| Humidity [RH %] | 31 | 33 | 35 | 37 | 39 | 41 | 45 | 26 | 27 | 29 | 46 |
| Product capacity [μF] | 1360 | 1350 | 1310 | 1330 | 1320 | 1300 | 1280 | 1320 | 1300 | 1320 | — |
| ESR before high-temperature and high-humidity [mΩ] | 6 | 5 | 5 | 5 | 5 | 5 | 5 | 6 | 6 | 6 | — |
| ESR after high-temperature and high-humidity [mΩ] | 9 | 7 | 5 | 5 | 5 | 7 | 8 | 26 | 23 | 21 | — |

Since too many short-circuited products were obtained in Comparative Example 4, capacity and ESR could not be measured.

Examples 8 to 14 and Comparative Examples 5 to 8

A niobium powder sintered compact having a density of 3.4 g/cm$^3$ was obtained by the same method as in Example 1 except that a niobium powder having CV that was product of capacity and formation voltage of 300,000 μF·V/g, having the surface naturally oxidized and oxygen content of 92,000 ppm and a nitriding amount of 13,000 ppm in total was used instead of the tantalum powder; a niobium lead wire was used instead of the tantalum lead wire; the calsination temperature was set 1280° C. and the calsination period was set 30 minutes.

A sintered compact with a dielectric layer was obtained by the same method as in Example 1 except that the chemical conversion treatment of the sintered compact was performed with the potential difference of 23V. The dielectric layer contained niobium pentoxide.

Subsequently, the sintered compact was immersed in an aqueous solution of 10% iron xylenesulfonate excluding a part of the lead wire. The sintered compact was taken out of the solution and dried at 105° C. The operation of the immersion in the iron xylenesulfonate aqueous solution and the drying was repeated 5 times.

An element for an electronic component having a semiconductor layer was obtained by the same method as in Example 1 except that the concentration of the 3,4-ethylenedioxythiophene alcohol solution was changed to 20%, the leaving time after being taken out of the alcohol solution was changed to 8 minutes whereby it took 8.5 minutes from the sticking of the precursor to the starting of the electropolymerization, the humidity during the leaving was changed to the condition shown in Table 2, the wind speed during the leaving was changed to a range of 0.3 to 0.5 m/s, and the potential difference during the chemical conversion retreatment was changed to 14V. The elements for an electronic component in Examples 8 to 14 had projections having the size shown in Table 2 on the outer surfaces of the semiconductor layers. The elements for an electronic component in Comparative Examples 5 to 8 did not have a projection on the outer surface of the semiconductor layer. A solid electrolytic capacitor was obtained by the same method as in Example 1 except that the conditions of the aging treatment were changed to 125° C., 6V and 4 hours.

ESR and capacity of the solid electrolytic capacitor were measured by the same method as in Example 1. The result is shown in Table 2. In Examples 8 to 14 and Comparative Examples 5 to 8, the operations other than the one for which the temperature and the humidity were particularly indicated were performed in a constant-humidity booth at the temperature of 19° C.

TABLE 2

|  | Example | | | | | | | Comp. Example | | | |
| --- | --- | --- | --- | --- | --- | --- | --- | --- | --- | --- | --- |
|  | 8 | 9 | 10 | 11 | 12 | 13 | 14 | 5 | 6 | 7 | 8 |
| Projection height [μm] | 4 | 29 | 32 | 68 | 46 | 13 | 8 | — | — | — | — |
| Projection size [μm] | 10 | 78 | 95 | 200 | 130 | 36 | 11 | — | — | — | — |
| Projection density [pieces/mm$^2$] | 9600 | 140 | 80 | 13 | 40 | 600 | 2500 | — | — | — | — |
| Carbon layer thickness [μm] | 14 | 32 | 25 | 23 | 23 | 23 | 25 | 36 | 27 | 33 | 29 |
| Humidity [RH %] | 30 | 33 | 35 | 37 | 40 | 43 | 45 | 29 | 46 | 48 | 49 |
| Product capacity [μF] | 590 | 570 | 560 | 560 | 560 | 530 | 510 | 590 | — | — | — |
| ESR before high-temperature and high-humidity [mΩ] | 13 | 12 | 12 | 12 | 12 | 12 | 12 | 13 | — | — | — |
| ESR after high-temperature and high-humidity [mΩ] | 19 | 17 | 12 | 12 | 12 | 15 | 18 | 42 | — | — | — |

Since too many short-circuited products were obtained in Comparative Examples 6, 7, and 8, capacity and ESR could not be measured.

As shown in Table 1 and Table 2, it is known that the ESR of the electronic component such as solid electrolytic capacitor obtained from the element for an electronic component in Example having projections on the surface of the semiconductor layer rarely rises even after being left for a long time under high temperature and high humidity. That is, it is known that the element for an electronic component of the present invention has a excellent adhesiveness between the semiconductor layer and other layers, which are hardly separated even after being left under high temperature and high humidity. On the other hand, the electronic component such as solid electrolytic capacitor obtained from the element for an electronic component in Comparative Example having no projection on the surface of the semiconductor layer has its ESR raised after being left for a long time under high temperature and high humidity and has many short-circuited products. That is, it is known that the element for an electronic component in Comparative Example has other layers separated from the semiconductor layer if being left under high temperature and high humidity.

The invention claimed is:

1. An element for an electronic component comprising a semiconductor layer which has projections having a height of 2 to 70 μm on an outer surface of the semiconductor layer, wherein each of the projections has a plurality of microspikes thereon.

2. An element for an electronic component comprising a semiconductor layer and one or more conductor layers which are laminated, in which
there are projections on an outer surface of the semiconductor layer,
the conductor layer in contact with the outer surface of the semiconductor layer is a conductive carbon layer,
the projections on the outer surface of the semiconductor layer are embedded into the conductive carbon layer to not less than 25% deep of a thickness of the conductive carbon layer, and
the tip of the projections does not protrude from the outer surface of the conductor layer, wherein each of the projections has a plurality of microspikes thereon.

3. An element for an electronic component comprising an anode body, a dielectric layer, a semiconductor layer and one or more conductor layers which are laminated in this order, in which
there are projections on an outer surface of the semiconductor layer,
the conductor layer in contact with the outer surface of the semiconductor layer is a conductive carbon layer,
the projections on the outer surface of the semiconductor layer are embedded into the conductive carbon layer to not less than 25% deep of a thickness of the conductive carbon layer, and
the tip of the projections does not protrude from the outer surface of the conductor layer, wherein each of the projections has a plurality of microspikes thereon.

4. The element for an electronic component according to claim 1, wherein the size of the projections by observation from the normal direction of the semiconductor layer is not more than three times the height of the projections.

5. The element for an electronic component according to claim 1, wherein the number of the projections per unit area on the outer surface of the semiconductor layer is $10^1$ to $10^4/mm^2$.

6. The element for an electronic component according to claim 1, wherein the semiconductor layer comprises an organic semiconductor.

7. The element for an electronic component according to claim 6, wherein the organic semiconductor is a conductive polymer having a repeating unit derived from at least one compound selected from pyrroles, thiophenes, alkylthiophenes, alkylenedioxythiophenes, anilines, phenylenes, acetylenes, furanes, phenylenevinylenes, acenes, and azulenes.

8. The element for an electronic component according to claim 6, wherein the organic semiconductor contains a conductive polymer having a repeating unit derived from 3,4-ethylenedioxythiophene.

9. The element for an electronic component according to claim 6, wherein the semiconductor layer further comprises arylsulfonic acid or its salt.

10. The element for an electronic component according to claim 2, wherein the conductor layer comprises the conductive carbon layer and a conductive metal layer.

11. The element for an electronic component according to claim 10, wherein the conductive metal layer comprises a conductive metal powder and a binder.

12. The element for an electronic component according to claim 11, wherein the conductive metal powder is at least one powder selected from the group consisting of silver powder, copper powder, aluminum powder, nickel powder, copper-nickel alloy powder, silver alloy powder, silver mixed powder, and silver coated powder.

13. The element for an electronic component according to claim 11, wherein the binder is a resin.

14. The element for an electronic component according to claim 10, wherein the conductive metal layer comprises 3 to 10% by mass of resin and 90 to 97% by mass of conductive metal powder.

15. An electronic component comprising an element for an electronic component according to claim 1 in which the element is encapsulated.

16. An electronic component according to claim 15, wherein the electronic component is a solid electrolytic capacitor.

17. An element for an electronic component comprising a semiconductor layer which has projections having a height of 2 to 70 μm on an outer surface of the semiconductor layer, wherein the surface of the projections is rough.

18. An element for an electronic component comprising a semiconductor layer and one or more conductor layers which are laminated, in which
there are projections on an outer surface of the semiconductor layer,
the conductor layer in contact with the outer surface of the semiconductor layer is a conductive carbon layer,
the projections on the outer surface of the semiconductor layer are embedded into the conductive carbon layer to not less than 25% deep of a thickness of the conductive carbon layer, and
the tip of the projections does not protrude from the outer surface of the conductor layer, wherein the surface of the projections is rough.

19. An element for an electronic component comprising an anode body, a dielectric layer, a semiconductor layer and one or more conductor layers which are laminated in this order, in which
there are projections on an outer surface of the semiconductor layer,
the conductor layer in contact with the outer surface of the semiconductor layer is a conductive carbon layer, the projections on the outer surface of the semiconductor layer are embedded into the conductive carbon layer to not less than 25% deep of a thickness of the conductive carbon layer, and the tip of the projections does not protrude from the outer surface of the conductor layer, wherein the surface of the projections is rough.

20. The element for an electronic component according to claim 17, wherein the size of the projections by observation from the normal direction of the semiconductor layer is not more than three times the height of the projections.

21. The element for an electronic component according to claim 17, wherein the number of the projections per unit area on the outer surface of the semiconductor layer is $10^1$ to $10^4/mm^2$.

22. The element for an electronic component according to claim 17, wherein the semiconductor layer comprises an organic semiconductor.

23. The element for an electronic component according to claim 22, wherein the organic semiconductor is a conductive polymer having a repeating unit derived from at least one compound selected from pyrroles, thiophenes, alkylthiophenes, alkylenedioxythiophenes, anilines, phenylenes, acetylenes, furanes, phenylenevinylenes, acenes, and azulenes.

24. The element for an electronic component according to claim 22, wherein the organic semiconductor contains a conductive polymer having a repeating unit derived from 3,4-ethylenedioxythiophene.

25. The element for an electronic component according to claim 22, wherein the semiconductor layer further comprises arylsulfonic acid or its salt.

26. The element for an electronic component according to claim 18, wherein the conductor layer comprises the conductive carbon layer and a conductive metal layer.

27. The element for an electronic component according to claim 26, wherein the conductive metal layer comprises a conductive metal powder and a binder.

28. The element for an electronic component according to claim 27, wherein the conductive metal powder is at least one powder selected from the group consisting of silver powder, copper powder, aluminum powder, nickel powder, copper-nickel alloy powder, silver alloy powder, silver mixed powder, and silver coated powder.

29. The element for an electronic component according to claim 27, wherein the binder is a resin.

30. The element for an electronic component according to claim 26, wherein the conductive metal layer comprises 3 to 10% by mass of resin and 90 to 97% by mass of conductive metal powder.

31. An electronic component comprising an element for an electronic component according to claim 17 in which the element is encapsulated.

32. An electronic component according to claim 31, wherein the electronic component is a solid electrolytic capacitor.

* * * * *